April 23, 1935. A. F. LARSEN 1,998,726
PERCOLATOR HEATER
Filed Aug. 21, 1933   2 Sheets-Sheet 1

Inventor
A. F. Larsen

April 23, 1935. A. F. LARSEN 1,998,726
PERCOLATOR HEATER
Filed Aug. 21, 1933    2 Sheets-Sheet 2
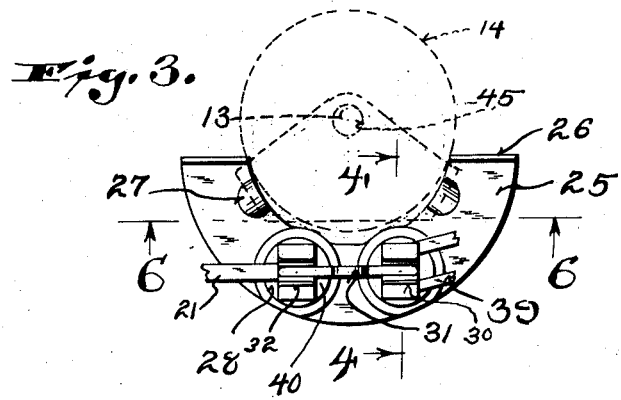
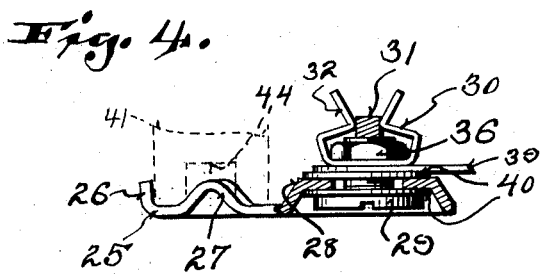
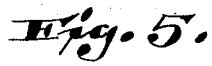
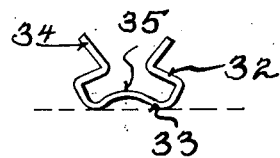
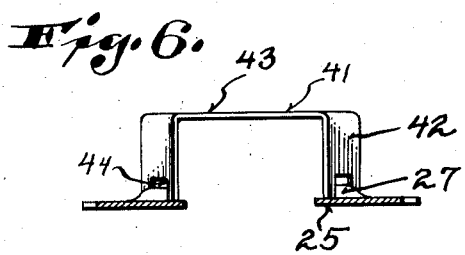
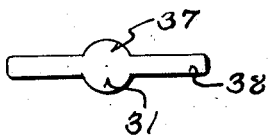

Patented Apr. 23, 1935

1,998,726

UNITED STATES PATENT OFFICE 1,998,726

PERCOLATOR HEATER

Alantser F. Larsen, Manitowoc, Wis., assignor to Aluminum Goods Manufacturing Company, Manitowoc, Wis.

Application August 21, 1933, Serial No. 686,053

4 Claims. (Cl. 219—44)

This invention appertains to electric immersion heaters and more particularly to liquid electric heating units of the type particularly adaptable for use with coffee percolators, but which are susceptible for other purposes.

In electric percolators, difficulty has been experienced in the housewife allowing the coffee pot to boil dry with the consequent injury to the pot and heating element. It has been proposed to utilize a fuse in the circuit with the heating element and this fuse has uniformly been placed within the retaining bottom cap for the heating element. Due to the fluctuating temperature of the retaining cap and the high heat which the same sometimes reaches, this has proven highly unsatisfactory as the varying temperature has a deteriorating effect on the fuse link and in some instances, the high heat reached would melt the fuse even where the pot was operating under normal conditions.

It is therefore one of the primary objects of my invention to provide novel means for associating the fuse with the percolator, so that the same will be subjected to a constant temperature under normal operating conditions, but which will be immediately affected by abnormal conditions to break the circuit to the heating element and consequently prevent injury to the percolator.

Another salient object of my invention is the provision of novel means for positioning the fuse link exteriorly of the retaining cap for the heating element and in contact with the bottom of the pot, whereby the fuse link will be subjected to a constant normal temperature, due to the contacting of the water with the bottom of the pot, the arrangement of the fuse link being such that the same can be reached and renewed with the expenditure of a minimum amount of time and energy by a lay person.

A further important object of my invention is the provision of a supporting plate carrying the clips for detachably supporting the fuse link, the plate being of a character for direct engagement with the lower face of the bottom wall of the coffee percolator or pot, novel means being provided for holding the plate in position from the retaining bolt utilized for connecting the heating element and retaining cap in place.

A further object of my invention is to provide novel means for constructing the plate relative to the retaining cap and holding means whereby a minimum amount of contact between the plate and cap is insured, so as to reduce the transmission of heat from said cap to the plate, the plate being preferably formed from a particular type of metal, which will reduce electric conductivity, so that voltage leakages are reduced, but which has exceptional heat conductivity.

A further object of my invention is to provide novel means for constructing the clips themselves, so that positive engagement between the same and the fuse link is insured irrespective of the action of the metal, from which the fuse is formed, under pressure.

With these and other objects in view, the invention consists in the novel construction, arrangement and formation of parts, as will be hereinafter more specifically described, claimed and illustrated in the following drawings, in which:—

Figure 3 is a top plan view of the supporting plate utilized for the fuse link, the retaining cap for the heating element and the supporting bracket for the plate being shown in dotted lines to illustrate the formation of the plate relative to said retaining cap.

Figure 4 is a detail section through the plate taken on the line 4—4 of Figure 3 looking in the direction of the arrows.

Figure 5 is an end elevation of one of the retaining clips for the fuse link illustrating the construction and shape thereof prior to being assembled with the plate.

Figure 6 is a detailed section through the plate taken on the line 6—6 of Figure 3 looking in the direction of the arrows, showing the supporting bracket in engagement with the plate.

Figure 7 is a side elevation of the fuse link.

Referring to the drawings in detail, wherein similar reference characters designate the corresponding parts throughout the several views, the letter A generally indicates an electric coffee percolator embodying the principles of my invention.

Figure 1:
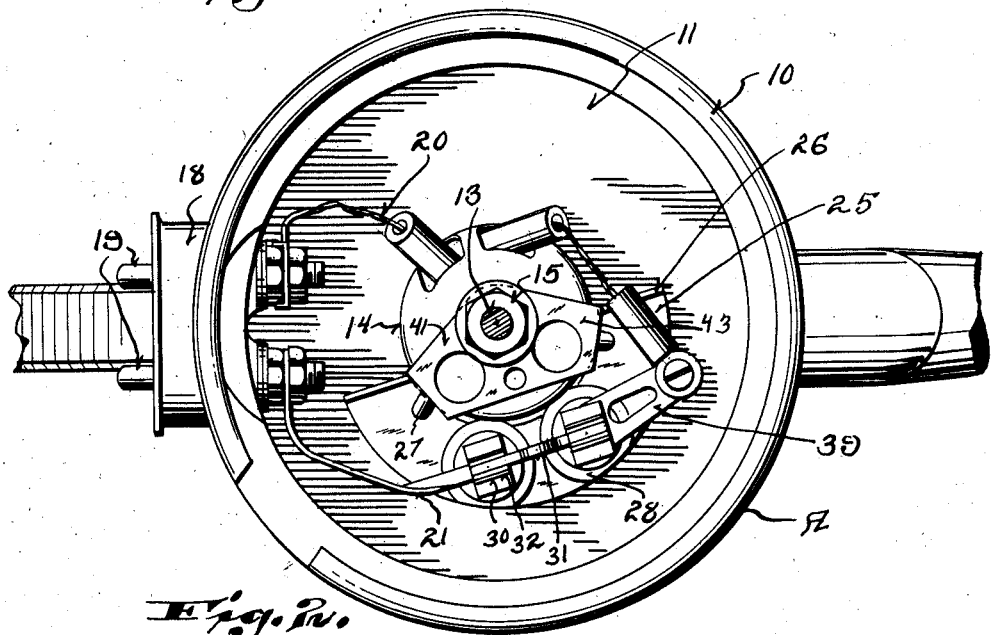
Figure 1 is a bottom plan view of an electric coffee percolator with the shield plate removed to illustrate the novel means employed for associating the fuse with the percolator.
Figure 2:
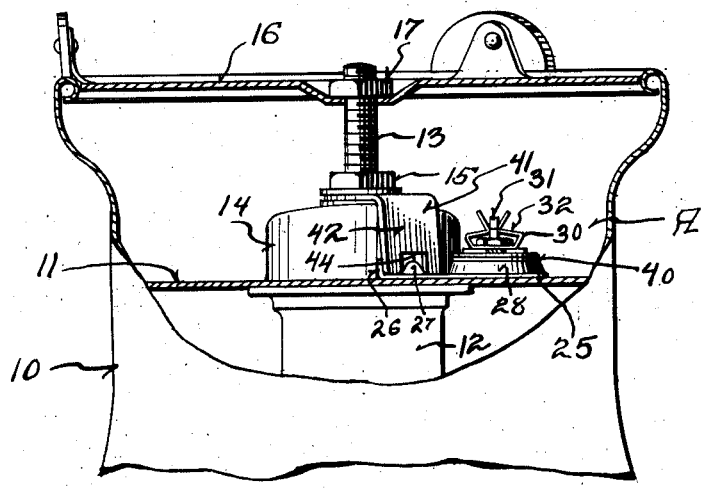
Figure 2 is a fragmentary sectional view through the lower end of the percolator, the percolator being inverted to its assembling position.

The percolator A embodies a pot or receptacle 10 having a bottom wall 11, the axial center of which receives interiorly the electric heating element 12. The electric heating element carries an axial bolt 13 on which is placed a retaining cap 14 for engaging the outer face of the bottom wall 11. A clamping nut 15 is utilized for drawing the cap 14 and the heating element 12 into intimate contact with the opposite sides of the bottom wall. The bolt 13 is of sufficient length to extend through the axial center of the shield plate 16, which is fitted against the extreme lower edge of the pot or receptacle. A second clamping nut 17 is threaded on the bolt 13 for engaging said shield plate. For this particular construction, see my pending application, Serial No. 620,311, filed July 1, 1931.

As in the usual practice, the skirt of the side wall of the receptacle or pot 10 between the bottom wall and the shield plate 16 supports a socket 17 for the contact pins 19, whereby the pot can be electrically connected with an electric plug electrically connected with wires leading from a convenient house outlet.

Electrically connected with the inner ends of the contact pins 19 are feed and return wires 20 and 21 for the electric heating element 12. As shown, the wire 20 leads into the cap 14 for electric connection with the resistance or heating coil (not shown). This wire then leads exteriorly of the cap, as shown. Suitable tubular insulators can be placed around the cap at the desired points.

In accordance with my invention, I provide a flat supporting plate 25 of substantially semi-annular shape in plan. This plate 25 can be formed from any preferred metal, but I preferably construct the same from a colored aluminum (known to the trade as alumilite). This material has good heat conducting qualities and absorption, but reduces electric conductivity, so that voltage leakages are reduced to a minimum. This plate is placed into intimate contact with the lower outer face of the bottom wall 11. In assembling the plate with the pot, it is preferred to space the same entirely from the retaining cap 14, to prevent the transmission of heat from the cap to the plate. However, in mass production, the assembling operators tend to push the plate into engagement with the cap. To reduce the engagement of the plate with the cap, under these conditions, the inner edge of the cap is struck on a less arc of a circle than the arc of the circle on which the cap is formed, so that only the inner corner ends of the plate will engage said cap. This also provides means for locating the plate relative to the cap. The ends of the plate are preferably out-turned as at 26 for structural purposes and the inner edge of the plate adjacent to these up-turned ends 26 are provided with out-struck ears 27, for a purpose, which will be later set forth.

On opposite sides of the central portion of the plate, the plate has struck up therefrom hollow bosses 28 and these bosses receive and house the retaining screws or bolts 29 for resilient clips 30 employed for detachably supporting the fuse link 31.

Referring more particularly to the resilient clips 30, it is to be noted that the same embody resilient legs 32 and a connecting body strip 33. The extreme upper ends of the legs are flared outwardly as at 34 so as to provide means for facilitating entrance of the ends of the fuse link in the clips.

Particular attention is invited to the fact that the connecting body or bridge strap 33 is normally bulged upwardly as at 35. When the inner ends of the bolts 29 are inserted through the connecting body portions or bridge straps 33 and the retaining nuts on the bolts are drawn down tight, the bridge straps tend to straighten out moving the legs 32 toward one another. This increases the resiliency of the legs and insures intimate contact between the clips and the fuse link. Thus, even if the metal from which the link is made tends to flatten out or spread, a good grip and contact is still insured.

The link 31 itself is of a special construction and the same includes an enlarged central body portion 37 and oppositely extending legs 38. The provision of the enlarged central body portion has several advantages, such as the preventing of the sagging of the link.

By referring to Figure 1, it can be seen that the wire 20 which leads from the heating and resistance coil is connected to one clip 31 by means of an arm 39. The return buss wire 21 is electrically connected to the other clip. These clips are electrically insulated from the plate 25 by means of insulating washers 40. I am enabled to use relatively thin insulating washers in view of the material from which the plate is made.

Novel means is employed for holding the plate in position and this means embodies a supporting and holding bracket 41. The bracket 41 is of a substantially U-shape and includes end legs 42 and a connecting body 43. The terminals of the legs 42 are bifurcated or notched as at 44 for the reception of the struck-up lugs 27 heretofore referred to formed on the plate. The connecting body portion 43 of the bracket is provided with an opening 45 which is slipped over the retaining bolt 13. The clamping nut 15 acts as means for drawing the bracket into firm contact with the cap 14 and with the plate. Thus, the same nut that holds the retaining cap in position is employed for holding the supporting bracket 41 and the plate 25 in place. The body portion of the bracket is preferably so formed as to only make contact with the retaining cap at its central portion, so as to reduce conductivity.

Obviously, from this improved construction, it can be seen that the plate 25 is only subjected to the heat of the bottom wall 11 of the percolator. The water in the percolator reaches a constant temperature in a relatively short space of time and consequently, under normal operating conditions, the fuse link is subjected only to a constant temperature, which is extremely low, when compared to the temperature of the retaining cap 14 and the heating element.

As the plate and consequently the fuse link is in direct contact with the bottom wall of the percolator, the plate will be immediately affected by abnormal conditions. Thus, should the percolator be operated under dry conditions, the consequent high temperature of the bottom wall will be immediately transferred to the plate and to the fuse link. This will permit the instant operation of the fuse link to break the circuit.

To remove the fuse link, it is merely necessary to remove one nut 17 and take off the shield plate 16. The fuse link will be immediately exposed to view and can be easily replaced by a new one by the ordinary layman.

In actual practice, it is contemplated of carrying an additional fuse link by the inner face of the shield plate 16.

Changes in details may be made without departing from the spirit or the scope of my invention, but what I claim as new is:—

1. In an electric heating device, the combination of a vessel for receiving a liquid to be heated, having a bottom wall, an electric heating element carried by the bottom wall and projecting into said vessel, a supporting plate disposed in intimate contact with the outer surface of the bottom wall in spaced relation to the heating element, contact clips carried directly by and electrically insulated from the plate, a fuse link detachably received in said clips, and means electrically connecting the clips in series with the electric heating element.

2. In an electric heating device, the combination of a vessel for the reception of a liquid to be heated having a bottom wall, an electric heating element extending into the vessel having a bolt extending through the said bottom wall, a retaining cap fitted against the outer face of the bottom wall, a nut on said bolt engaging the retaining cap, a supporting plate fitted in intimate contact with the outer surface of the bottom wall, contact clips carried by and electrically insulated from said plate, a fuse link detachably supported by the clips, means electrically connecting the clips and fuse link in series with the heating element, and means for retaining the plate in position from said bolt.

3. In an electric heating device, the combination of a vessel for receiving a liquid to be heated having a bottom wall, an electric heating element extending into the receptacle having a retaining bolt extending through said wall, a retaining cap engaging the outer surface of the wall and fitted on said bolt, a supporting plate placed in intimate contact with the outer surface of the bottom wall on the outside of the cap, clips carried by and electrically insulated from the plate, a fuse link detachably supported by the clips, means electrically connecting the clips and link in series with the heating element, the plate having out-struck lugs formed thereon, a supporting bracket having notched legs for engaging the lugs and an opening for receiving the bolt, and a nut threaded on the bolt in engagement with the bracket for urging the bracket toward the plate.

4. In an electric heating device, the combination of a vessel for receiving a liquid to be heated having a bottom wall, an electric heating element disposed in the vessel having its inner end engaging the inner face of the bottom wall and provided with a retaining bolt extending through said bottom wall, a retaining cap fitted on the bolt and engaging the outer face of the bottom wall, a semiannular shaped supporting plate fitted in intimate contact with the outer surface of said bottom wall on the outside of said cap, the inner edge of said plate being struck on an arc of a circle having a less radius than the arc of the circle on which the body of the cap is struck, whereby the corner ends of the plate will contact only with said cap, resilient clips carried by and electrically insulated from said plate, a fuse link detachably supported by clips, means electrically connecting the clips and link in series with the electric heating element, a supporting bracket of substantially U-shape engaging over the cap with its legs in contact with the plate, and a retaining nut threaded on the bolt in engagement with the bracket for urging the bracket toward the cap and the legs in contact with the plate.

ALANTSER F. LARSEN.